US012729973B2

(12) United States Patent
An et al.

(10) Patent No.: US 12,729,973 B2

(45) Date of Patent: Sep. 8, 2026

(54) USER EQUIPMENT AND CONTROL METHOD THEREOF

(71) Applicants: Hyundai Motor Company, Seoul (KR); Kia Corporation, Seoul (KR)

(72) Inventors: Rowoon An, Seoul (KR); Jae Yul Woo, Seoul (KR); Seunghyun Woo, Seoul (KR); Soobin Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 90 days.

(21) Appl. No.: 17/675,472

(22) Filed: Feb. 18, 2022

(65) Prior Publication Data

US 2022/0390250 A1 Dec. 8, 2022

(30) Foreign Application Priority Data

Jun. 3, 2021 (KR) ........................ 10-2021-0072247

(51) Int. Cl.

*G01C 21/36* (2006.01)
*G01C 21/00* (2006.01)
(Continued)

(52) U.S. Cl.

CPC ..... *G01C 21/3635* (2013.01); *G01C 21/3807* (2020.08); *G01C 21/3837* (2020.08);
(Continued)

(58) Field of Classification Search

None
See application file for complete search history.

(56) References Cited

U.S. PATENT DOCUMENTS 9,269,011 B1 * 2/2016 Sikka ..................... G06V 20/20
10,373,377 B1 * 8/2019 Niewiadomski ... G01C 21/3697
(Continued)

FOREIGN PATENT DOCUMENTS

JP 2012216152 A * 11/2012
JP 2014069907 A 4/2014
(Continued)

OTHER PUBLICATIONS

"Yasuhiro Fuchikawa, Photographing intermediary device and control program of photographing intermediary device, Nov. 8, 2012" NPL attached (Year: 2012).*

*Primary Examiner* — James M McPherson
*Assistant Examiner* — Bakari Underwood
(74) *Attorney, Agent, or Firm* — Slater Matsil, LLP

(57) ABSTRACT

An embodiment user equipment includes an image sensor configured to photograph a surrounding image, a display module, a communicator configured to communicate with a server, a database configured to store visual positioning system (VPS) map information based on augmented reality (AR) and two dimensional (2D) map information, and a controller configured to generate 2D route information based on the 2D map information and delivery information received from the server, generate three dimensional (3D) route information based on the delivery information and the VPS map information, and control the display module to display the 2D route information or the 3D route information based on a distance between the user equipment and a point of interest (POI) included in the delivery information, the 3D route information being based on augmented reality.

18 Claims, 8 Drawing Sheets

(51) Int. Cl.

| | |
|---|---|
| ***G06F 3/14*** | (2006.01) |
| ***G06T 11/00*** | (2026.01) |
| ***G06T 15/00*** | (2011.01) |
| ***G06T 19/00*** | (2011.01) |

(52) U.S. Cl.

CPC ................ *G06F 3/14* (2013.01); *G06T 11/00* (2013.01); *G06T 15/00* (2013.01); *G06T 19/006* (2013.01)

(56) References Cited

U.S. PATENT DOCUMENTS

| | | | | |
|---|---|---|---|---|
| 10,438,390 | B2 | 10/2019 | Kim et al. | |
| 10,871,377 | B1 * | 12/2020 | Yu | G06V 20/20 |
| 2015/0323330 | A1 * | 11/2015 | Lord | G06Q 10/025<br>701/410 |
| 2019/0128693 | A1 * | 5/2019 | Song | G01C 21/3682 |
| 2019/0180485 | A1 * | 6/2019 | Kim | B60K 35/29 |
| 2020/0264007 | A1 * | 8/2020 | Yoo | G01C 21/20 |

FOREIGN PATENT DOCUMENTS

| | | | |
|---|---|---|---|
| KR | 101305059 | B1 | 9/2013 |
| KR | 20190078676 | A | 7/2019 |
| KR | 20200100259 | A | 8/2020 |

* cited by examiner

USER EQUIPMENT AND CONTROL METHOD THEREOF

CROSS-REFERENCE TO RELATED APPLICATIONS

This application claims the benefit of Korean Patent Application No. 10-2021-1072247, filed on Jun. 3, 2021, which application is hereby incorporated herein by reference.

TECHNICAL FIELD

The disclosure relates to a user equipment and a control method thereof.

BACKGROUND

Recently, services using augmented reality (AR) are increasing. A user may be provided with a more lively service than before through an AR service by using a user equipment.

For example, a map and navigation service using an AR technology may display an AR image of a point of interest (POI) related to various types of businesses such as a restaurant, a café, a grocery store, etc., at the location of the corresponding POI. That is, when a user photographs a POI using a user equipment, an AR image of the POI which is superimposed on the photographed image may be displayed at the location of the POI.

However, although a conventional map and navigation service using AR may be usefully applied to searching for a POI in a shopping district or a building district, a visual positioning system (VPS) map is required to be continuously updated due to geographical features and environmental changes, resulting in limiting the commercialization due to an increase in total cost of ownership (TCO).

SUMMARY

The disclosure relates to a user equipment and a control method thereof. Particular embodiments relate to a user equipment that provides augmented reality (AR) and a control method thereof.

An embodiment of the disclosure provides a user equipment and a control method thereof that may increase a usability of a POI search regardless of being indoors or outdoors (environmental conditions) and an absence of a global positioning system (GPS), and reduce total cost of ownership (TCO) through user participation.

Additional embodiments of the disclosure will be set forth in part in the description which follows and, in part, will be obvious from the description, or may be learned by practice of the disclosure.

According to an embodiment of the disclosure, there is provided a user equipment, including an image sensor configured to photograph a surrounding image, a display module, a communicator configured to communicate with a server, a database configured to store visual positioning system (VPS) map information based on augmented reality and two dimensional (2D) map information, and a controller configured to generate 2D route information based on the 2D map information and delivery information received from the server, generate three dimensional (3D) route information based on the delivery information and the VPS map information, and control the display module to display the 2D route information or the 3D route information based on a distance between a user and a point of interest (POI) included in the delivery information, the 3D route information being based on augmented reality.

The controller is configured to control the display module to display the 3D route information when the distance between the user and the POI is less than a predetermined distance.

The controller is configured to generate route information so that at least one of a time, a movement distance, and a congestion level is minimized.

The controller is configured to identify location information of the user based on the VPS map information and the surrounding image.

The controller is configured to generate real-time route information based on location information of the user and the delivery information.

The controller is configured to synthesize the POI represented as an AR-based 3D object to the surrounding image, and control the display module to display the synthesized image.

The database is configured to update the VPS map information based on the surrounding image.

The controller is configured to provide a weight to the surrounding image based on a feature of the surrounding image, and provide a reward point when the weight is higher than a predetermined reference.

The weight is provided based on at least one of a resolution, a capacity, and a length of the surrounding image, and the reward point varies depending on a sum of the weights.

According to an embodiment of the disclosure, there is provided a control method of a user equipment, the control method including storing VPS map information and 2D map information, the VPS map information being based on AR, receiving delivery information from a server, generating 2D route information based on the delivery information and the 2D map information, generating 3D route information based on the delivery information and the VPS map information, and controlling a display module to display the 2D route information or the 3D route information based on a distance between a user and a POI included in the delivery information.

BRIEF DESCRIPTION OF THE DRAWINGS

These and/or other features of embodiments of the disclosure will become apparent and more readily appreciated from the following description of the embodiments, taken in conjunction with the accompanying drawings, in which.

DETAILED DESCRIPTION OF ILLUSTRATIVE EMBODIMENTS

Figure 1:
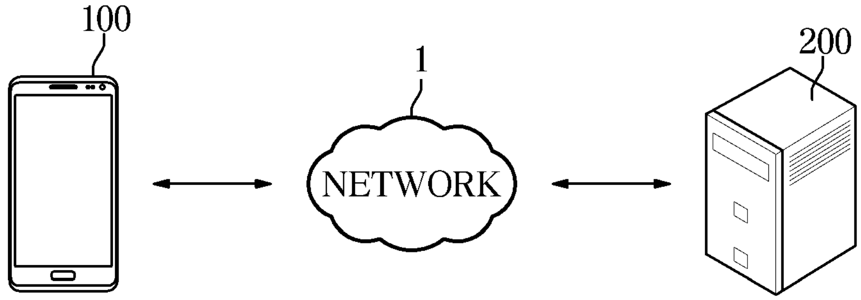
FIG. 1 illustrates an augmented reality (AR) mobility system according to an embodiment.

Like reference numerals throughout the specification denote like elements. Also, this specification does not describe all the elements according to embodiments of the disclosure, and descriptions well-known in the art to which the disclosure pertains or overlapped portions are omitted.

It will be understood that when an element is referred to as being "connected" to another element, it can be directly or indirectly connected to the other element, wherein the indirect connection includes "connection" via a wireless communication network.

It will be understood that the terms "include" when used in this specification, specify the presence of stated features, integers, steps, operations, elements, and/or components, but do not preclude the presence or addition of one or more other features, integers, steps, operations, elements, components, and/or groups thereof.

It is to be understood that the singular forms are intended to include the plural forms as well, unless the context clearly dictates otherwise.

The terms such as "~part", "~device", "~block", "~member", "~module", and the like may refer to a unit for processing at least one function or act. For example, the terms may refer to at least process processed by at least one hardware, such as field-programmable gate array (FPGA)/application specific integrated circuit (ASIC), software stored in memories or processors.

Reference numerals used for method steps are just used for convenience of explanation, but not to limit an order of the steps. Thus, unless the context clearly dictates otherwise, the written order may be practiced otherwise.

Hereinafter, a user equipment and a control method thereof according to embodiments of the disclosure will be described in detail with reference to the accompanying drawings.

FIG. 1 illustrates an augmented reality (AR) mobility system 100 according to an embodiment.

According to an embodiment, the AR mobility system 100 enables a delivery person to easily search for information on a location, etc., of a point of interest (POI) through indoor/outdoor AR navigation based on a visual positioning system (VPS)-based map, which is a core technology of AR, and to continuously update a VPS map directly through user participation.

Referring to FIG. 1, the AR mobility system 100 includes a user equipment 100, a server 200 and a network 1. The user equipment 100 displays a route to a POI, whether the user approaches the POI, or an AR image of the POI according to a user's selection. The server 200 manages VPS map information, 2D map information and delivery information. The network 1 provides communication between the user equipment 100 and the server 200.

For instance, the delivery information may include location information of the POI. Specifically, the delivery information may include information about a package to be delivered, a delivery origin, a delivery destination, a current location of a delivery person, a phone number including the delivery person and/or a delivery client, etc., without being limited thereto. Also, for example, the information about the delivery origin and the delivery destination may include not only location information, but also location-related information including a surrounding image, a video, etc., of a corresponding place.

More specifically, for example, the delivery information may further include information about whether the package to be delivered is ready.

For example, the network 1 may include a 3$^{rd}$ generation partnership project (3GPP) network, a long term evolution (LTE) network, a 5th generation network, a world interoperability for microwave access (WIMAX) network, Internet, a local area network (LAN), a wireless LAN, a wide area network (WAN), a personal area network (PAN), a Bluetooth network, a satellite broadcasting network, an analog broadcasting network, a digital multimedia broadcasting (DMB) network, and the like, without being limited thereto.

For example, the user equipment 100 may include all types of wired/wireless communication devices capable of inputting/outputting such as a personal communication system (PCS), a global system for mobile communication (GSM), a personal digital cellular (PDC), a personal handyphone system (PHS), a personal digital assistant (PDA), an international mobile telecommunication (IMT)-2000, a code division multiple access (CDMA)-2000, a wideband CDMA (WCDMA) terminal, a wireless broadband Internet (WiBro) terminal, a smartphone, a smart pad, a tablet personal computer (PC), a notebook, a wearable device, digital signage, and the like.

Also, the user equipment 100 may include an equipment of the delivery person, an equipment of the delivery client who requests delivery, an equipment of an administrator, and the like. Hereinafter, however, the user equipment 100 will be described as the equipment of the delivery person for convenience of description.

For instance, the user equipment 100 may calculate location information of the user equipment 100 based on the surrounding image photographed by the user equipment 100, and generate a route to the POI based on the location information. Also, the user equipment 100 may synthesize a route represented as an AR-based three dimensional (3D) object to the photographed surrounding image and provide the user with the route. Further, the user equipment 100 may update a map based on the photographed surrounding image, and thereby may improve a reliability of the map.

According to an embodiment, when the user transmits a surrounding image photographed by the user equipment 100 to the server 200, the user equipment 100 may provide a weight to the surrounding image and provide a reward point to the user based on the weight. For instance, the reward point may be a point or a mileage for purchasing other products, or a reserve that may be used like cash.

Also, the user equipment 100 may control an image displayed according to a location of the user and a distance between the user and the POI. That is, the user equipment 100 may output two dimensional (2D) route information based on the 2D map information or 3D route information based on the AR-based VPS map information, based on criteria such as the distance between the user and the POI, indoors/outdoors, etc.

The server 200 may receive a request for the AR-based VPS map information and the 2D map information from the user equipment 100. For instance, the server 200 may be a server or a device that collects information including a surrounding image photographed by the user equipment 100, a route, a current location of the delivery person, and the like, or the server 200 may be the same server or device as the user equipment 100.

Figure 2:
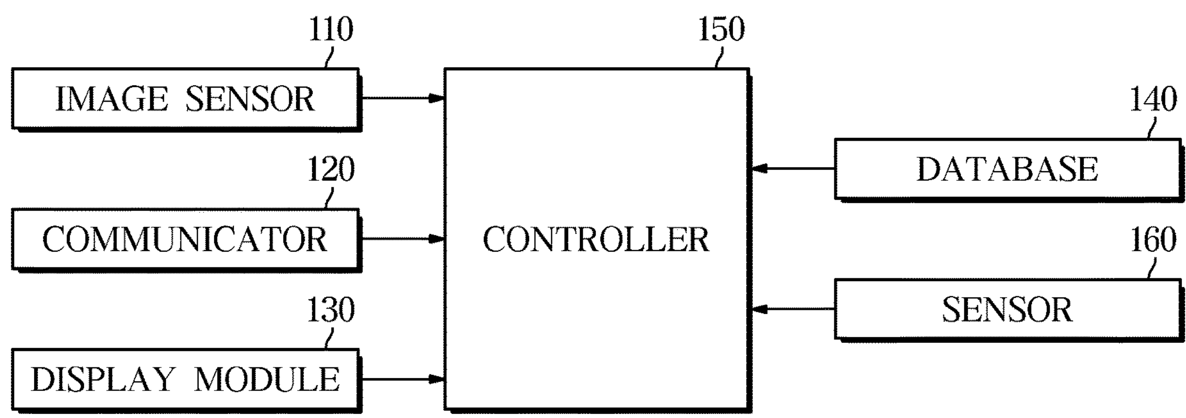
FIG. 2 is a block diagram illustrating a configuration of a user equipment according to an embodiment.

FIG. 2 is a block diagram illustrating a configuration of the user equipment 100 according to an embodiment.

Referring to FIG. 2, according to an embodiment, the user equipment 100 may include an image sensor no, a communicator 120, a display module 130, a database 140, a controller 150, and a sensor 160.

For example, the image sensor no may be provided on a front and/or rear side of the user equipment 100 to acquire an image of a front and/or rear of the user equipment 100. That is, the image sensor no may photograph and acquire a surrounding image of the user equipment 100. A known type of image sensor may be applied to the image sensor no, and a shape and type of the image sensor no are not limited, e.g., various types of image sensors may be applied to the image sensor no.

Meanwhile, for example, the surrounding image photographed by the image sensor no may include not only image information on the front and/or rear of the user equipment 100, but also video information.

The communicator 120 may communicate with the server 200 through the network 1, receive VPS map information, 2D map information, delivery information, etc., from the server 200, and transmit the surrounding image photographed by the image sensor no to the server 200. The communicator 120 may be a known type of wireless communication module.

The display module 130 may be provided on the front and/or rear side of the user equipment 100, display the surrounding image photographed by the image sensor 110, and display an AR-based 3D object or image by superimposing the AR-based 3D object on the surrounding image photographed by the image sensor 110. To implement the above, the display module 130 may be a known type of display module. Also, for instance, the display module 130 may be provided integrally with an input module and used as the input module to receive an input from the user.

That is, the display module 130 may be a device to transmit the user input to the controller 150 based on the input from the user (e.g., a user's manipulation), without being limited thereto.

Meanwhile, according to an embodiment, the display module 130 may include a cathode ray tube (CRT), a flat panel display (FPD), a liquid crystal display (LCD), a plasma display panel (PDP), a light emitting diode (LED), and an organic light emitting diode (OLED) method, without being limited thereto. Accordingly, a type of display known in the art or to be developed may be applied to the display module 130.

The database 140 may store information on the surrounding image photographed by the image sensor 110, the delivery information, the 2D map information, and the AR-based VPS map information. For instance, the database 140 may store information received by the communicator 120 from the server 200, such as the AR-based VPS map information, the 2D map information, and the delivery information, etc. More specifically, the database 140 may update information stored in the database 140 based on the information received from the server 200.

According to another embodiment, the database 140 may be the same device or server as the server 200, without being limited thereto.

For instance, the AR-based VPS map information may include information on a 3D spatial map for a wide range of indoor and outdoor spaces. More specifically, the VPS map information may be a 3D spatial map generated based on a panoramic geometry, or may be 3D map information previously generated using known technologies such as a technology of generating a 3D spatial map from input of photographed surrounding images after learning a spatial map generation model from image data input through an artificial intelligence learning model. However, the AR-based VPS map information is not limited thereto. The VPS map information may be information generated through a spatial map generation method to be developed.

The controller 150 may generate 2D route information based on the delivery information received by the communicator 120 from the server 200 and 2D map information stored in the database 140. For example, the 2D route information may include information on a 2D route from a location of the user to a POI stored in the delivery information, and also include map information on surroundings of the corresponding route, without being limited thereto.

For instance, the POI may include a place where a delivery person picks up a package and a final destination of the package, without being limited thereto.

Also, the controller 150 may generate 3D route information based on the delivery information received by the communicator 120 from the server 200 and the VPS map information stored in the database 140. For example, the 3D route information may include information on a 3D route from the location of the user to the POI stored in the delivery information, and also include VPS map information on the surroundings of the corresponding route. In this instance, the 3D route is represented as the AR-based 3D object.

More specifically, a delivery origin where the delivery person picks up the package and the final destination of the package are mostly indoors. In indoor places such as an inside of building in a building district or a shopping district, the user may not easily search for the POI due to errors in POI display on a 2D map, etc. To overcome the above, the controller 150 may generate the 3D route information represented as the AR-based 3D object based on the delivery information and the VPS map information, and control the display module 130 to display the 3D route information.

That is, the controller 150 controls the display module 130 to display the 3D route information on the VPS map information, and thereby may enable the user to search for the POI more accurately.

Meanwhile, according to an embodiment, the controller 150 may identify location information of the user based on the VPS map information and the surrounding image photographed by the image sensor 110. That is, the controller 150 may compare the VPS map information stored in the database 140 to video or image information similar to the surrounding image photographed by the image sensor 110, calculate location information related to an image stored in the VPS map information, and thereby may identify location information of the user equipment 100, without being limited thereto.

According to another embodiment, for instance, the database 140 may store a VPS positioning model learned from input of a dataset generated based on metadata including an image or a video and location information related to the image or the video. Accordingly, the controller 150 may output a location related to the surrounding image photographed by the image sensor no, from input of the surrounding image photographed by the image sensor no to the VPS positioning model.

Meanwhile, according to another embodiment, the user equipment 100 may further include a learning processor. The learning processor may store a deep learning algorithm to train the VPS positioning model. However, the learning processor is not limited thereto, and a known machine learning algorithm including unsupervised learning, supervised learning, and reinforcement learning, or a machine learning algorithm to be developed may be applied to the learning processor.

For instance, the learning processor may generate metadata that associates the surrounding image photographed by the image sensor no and the location information of the user equipment 100, and may train the VPS positioning model based on the metadata. Here, the location information of the user equipment 100 may be location information of the user equipment 100 generated based on a global positioning system (GPS) sensor included in the sensor 160 or location information of the user equipment 100 generated by the controller 150 based on the VPS map information and the surrounding image photographed by the image sensor no. However, the location information of the user equipment 100 is not limited thereto.

Accordingly, for example, the user equipment 100 may generate a large amount of metadata based on the location information of the user equipment 100 and the surrounding image photographed by the image sensor no, may train the VPS positioning model by inputting the metadata to an artificial intelligence algorithm, and thereby may improve a reliability and stability of the VPS positioning model.

Meanwhile, in order to verify the VPS positioning model learned as above, the learning processor may input video or image data related to a place to the learned VPS positioning model, output location information corresponding to the image or the image data, and display the location information on the display module 130. In this case, the user determines whether the location information displayed on the display module 130 is correct, and thus the learning processor may generate the metadata with improved reliability and stability. Also, the reliability and stability of the VPS positioning model may be improved by inputting the metadata with improved reliability and stability. However, the learning processor is not limited thereto.

Meanwhile, according to an embodiment, the controller 150 may generate route information based on the delivery information and the 2D map information, so that at least one of a time taken to reach the POI, a movement distance, and a congestion level is minimized. More specifically, when the user sets a weight for each item (the time, the movement distance, the congestion level, etc.) through the display module 130 of the user equipment 100, the controller 150 may generate the route information based on the weight of each of the items.

For instance, when the user assigns a highest weight to the time through the display module 130, the controller 150 may generate route information that minimizes an expected arrival time, even though the movement distance increases, without being limited thereto.

Meanwhile, according to an embodiment, the controller 150 may generate real-time route information based on the delivery information and the location information of the user identified based on the VPS map information and the surrounding image photographed by the image sensor no. Here, for example, the location information of the user may be location information generated based on the VPS positioning model. The real-time route information may be used to enable the user who is moving to update the route information to the POI regardless of being indoors or outdoors, by identifying the location of the user equipment 100 which is moving based on the VPS map information and the surrounding image photographed by the image sensor no. However, the real-time route information is not limited thereto.

Meanwhile, for instance, the controller 150 may control the display module 130 to display the route information differently depending on a distance between the user's location and the POI.

More specifically, when the distance between the user's location and the POI is less than a predetermined distance, the controller 150 may control the display module 130 to display the AR-based 3D route information on the surrounding image photographed by the image sensor no.

Also, when the distance between the user's location and the POI is greater than the predetermined distance, the controller 150 may control the display module 130 to display the 2D route information on the 2D map information.

For example, because the POI (e.g., the delivery origin or the final destination of the package) is mostly indoors, the user may not easily search for the POI due to characteristics of a 2D map and an error in user's location. To overcome the above, the controller 150 may control the display module 130 to display the 2D route information or the 3D route information depending on the distance between the user's location and the POI.

That is, when the distance between the user's location and the POI is less than the predetermined distance, the user is about to approach the POI, and thus the controller 150 may synthesize the POI and the 3D route information represented as the AR-based 3D object to the surrounding image photographed by the image sensor no, and control the display module 130 to display the synthesized image, so that the user searches for the POI more easily.

By contrast, when the distance between the user's location and the POI is greater than the predetermined distance, the user is required to get the right route, and thus the controller 150 may control the display module 130 to display the 2D route information where a 2D route is synthesized into the 2D map information in order to search for the other route more easily.

For example, the predetermined distance may be a distance input by the user through the display module 130, e.g., 10 m, 20 m, etc., without being limited thereto.

According to another embodiment, the predetermined distance may be changed to another criterion based on a building boundary, a road width, a congestion level, a user speed, etc. That is, when the user enters a boundary of a building or passes through a narrow commercial district, the controller 150 may synthesize the 3D route to the surrounding image photographed by the image sensor no and control the display module 130 to display the synthesized image, without being limited thereto. According to still another embodiment, according to a user's setting, the controller 150 may control the display module 130 to display the 2D route information in parallel based on the predetermined distance above or the other criterion.

Meanwhile, according to an embodiment, the controller 150 may correct the location information of the user based on user location information generated from the sensor 160 more quickly and accurately.

More specifically, when the controller 150 generates the location information of the user based on the VPS map information and the surrounding image photographed by the image sensor 110, the amount of data processing may be increased. Accordingly, the controller 150 may extract a VPS map information candidate group to be compared to the surrounding image photographed by the image sensor 110, based on the user location information generated by the sensor 160. By comparing the VPS map information candidate group to the surrounding image photographed by the image sensor 110, the controller 150 may generate the location information of the user more quickly and accurately, without being limited thereto.

The database 140 may update the VPS map information based on the surrounding image photographed by the image sensor no. That is, by updating the stored VPS map information based on the surrounding image photographed by the image sensor no, the database 140 may update information on alleys, indoor areas, etc., that change frequently, through update of a 3D spatial map, without being limited thereto.

According to another embodiment, the user equipment 100 may transmit the surrounding image photographed by the image sensor 110 to the server 200 through the communicator 120, and the server 200 may update a VPS map based on the received surrounding image photographed by the image sensor no. According to still another embodiment, an administrator of the server 200 may update the VPS map information after examining the update of the VPS map based on the received surrounding image.

Meanwhile, the controller 150 may provide a weight to the surrounding image based on the surrounding image information photographed by the image sensor 110 in order to provide a reward point. For example, the weight may be a reference value for evaluating a quality of an image provided by the user, without being limited thereto.

More specifically, to prevent the VPS map from being updated based on video or image data with low quality, the controller 150 may provide the weight based on at least one of a resolution, a capacity, and a length of the surrounding image photographed by the image sensor no. For example, the controller 150 may provide a higher weight to a greater resolution, a larger capacity or a longer length.

In this case, the controller 150 may provide the reward point when a sum of the weights for each item (e.g., the resolution, the capacity, the length, etc.) is greater than a predetermined reference.

That is, the controller 150 may assign the weight for each image evaluation item (e.g., the resolution, the capacity, the length, etc.) to the surrounding image photographed by the image sensor 110 based on the image evaluation item, and provide the reward point when the sum of the weights is greater than the predetermined reference.

Also, the controller 150 may provide a higher reward point, as the sum of the weights is greater than the predetermined reference, without being limited thereto.

Meanwhile, for example, the predetermined reference may be a weight set to video or image data of sufficient quality to update the VPS map.

For instance, the sensor 160 may include a sensor to get position including a GPS, etc. That is, the sensor 160 may further include an inclination sensor, an inertial sensor, etc., capable of generating the location information of the user equipment 100 and detecting a direction, inclination, etc., of the user equipment boo. Accordingly, the sensor 160 may detect the direction and inclination in which the image sensor 110 of the user equipment 100 captures, and generate photographing direction information and inclination information.

Meanwhile, according to an embodiment, based on the sensors included in the sensor 160, the learning processor may generate metadata including location information related to video or image data based on the photographing direction of the image sensor 110 of the user equipment 100, may train the VPS positioning model by inputting the metadata to an artificial intelligence algorithm, and thereby may improve a reliability and stability of the VPS positioning model.

More specifically, for instance, a location may not be identified based on the VPS map information only with video or image data photographed in a direction of the ground. Accordingly, the learning processor may train the VPS positioning model based on the video or image data and the photographing direction information generated from the sensor 160, except for the video or image data including the ground, etc., which may not be used to identify the location of the user equipment 100.

Figure 3:
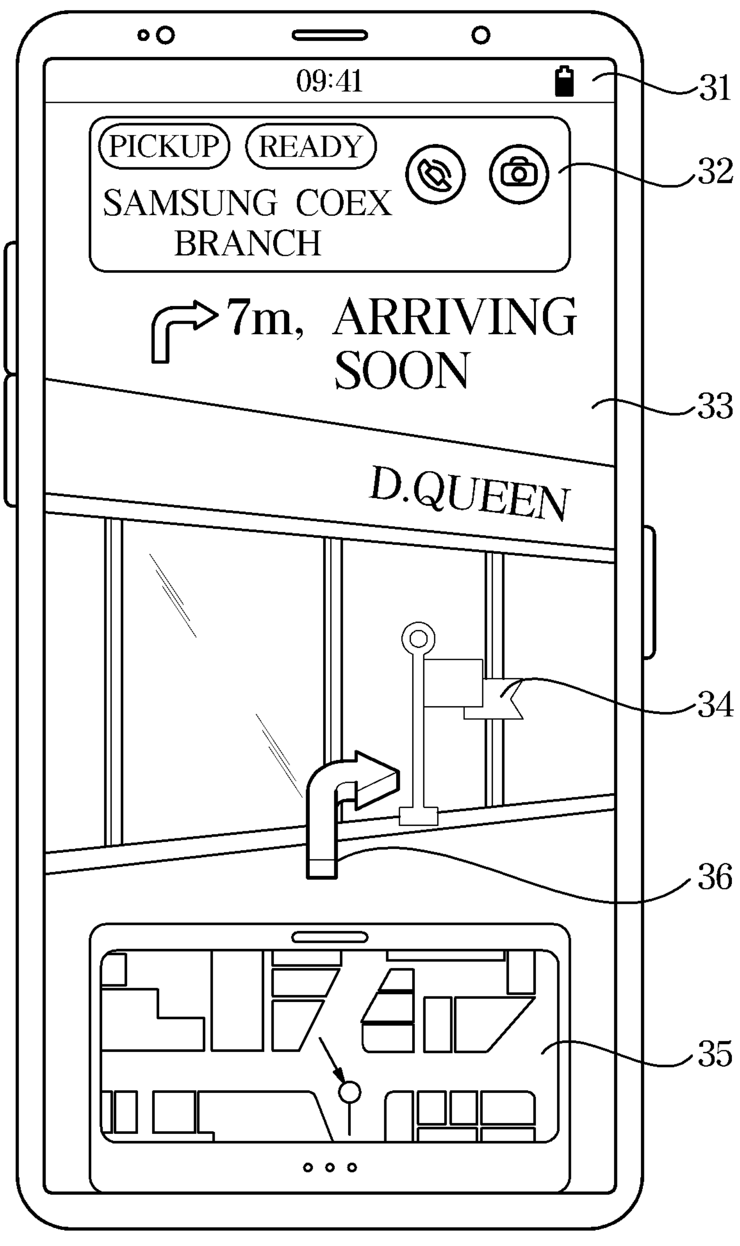
FIG. 3 is a diagram illustrating an example where a user equipment photographs a point of interest (POI) according to an embodiment.

FIG. 3 is a diagram illustrating an example where the user equipment 100 photographs a POI according to an embodiment.

As shown in FIG. 3, according to an embodiment, the display module 130 of the user equipment 100 may include a state display area 31, a delivery information area 32, a first route information output area 33 and a second route information output area 35.

For example, the state display area 31 may include information about a time, a radio signal strength (intensity), and a battery level, without being limited thereto.

Also, for example, the delivery information area 32 may include information about a type of delivery (e.g., pickup, shipping, etc.), and when the type of delivery is pickup, information on whether a package is ready, location information, and the like may be provided in the delivery information area 32. Also, the delivery information area 32 may provide an interface to connect a phone call to a delivery origin and connect photographing for the VPS map update.

For example, the controller 150 may control the display module 130 to display 2D route information or 3D route information in the first route information output area 33. The first route information output area 33 may include a remaining distance to a POI.

Also, for example, when the controller 150 controls the display module 130 to output the 3D route information, 3D route information 36 as an AR-based 3D virtual object may be displayed in the first route information output area 33. In this case, the controller 150 may control the display module 130 to display the 2D route information in the second route information output area 35.

For example, the 3D route information 36 may be generated by the controller 150 based on VPS map information and a surrounding image photographed by the image sensor 110, without being limited thereto.

Meanwhile, for instance, the controller 150 may control the display module 130 to display a 3D virtual object 34 representing a location of the POI on the surrounding image photographed by the image sensor 110, in the first route information output area 33, based on the VPS map information, delivery information, and the surrounding image photographed by the image sensor 110.

For example, the 3D virtual object 34 may be information included in the delivery information. That is, an administrator (or a user) at a delivery origin may input a pickup location based on video or image information on the delivery origin and transmit the pickup location to the server 200, and thus the controller 150 may control the display module 130 to display the 3D virtual object 34 in the first route information output area 33 based on the delivery information received from the server 200.

Figure 4:
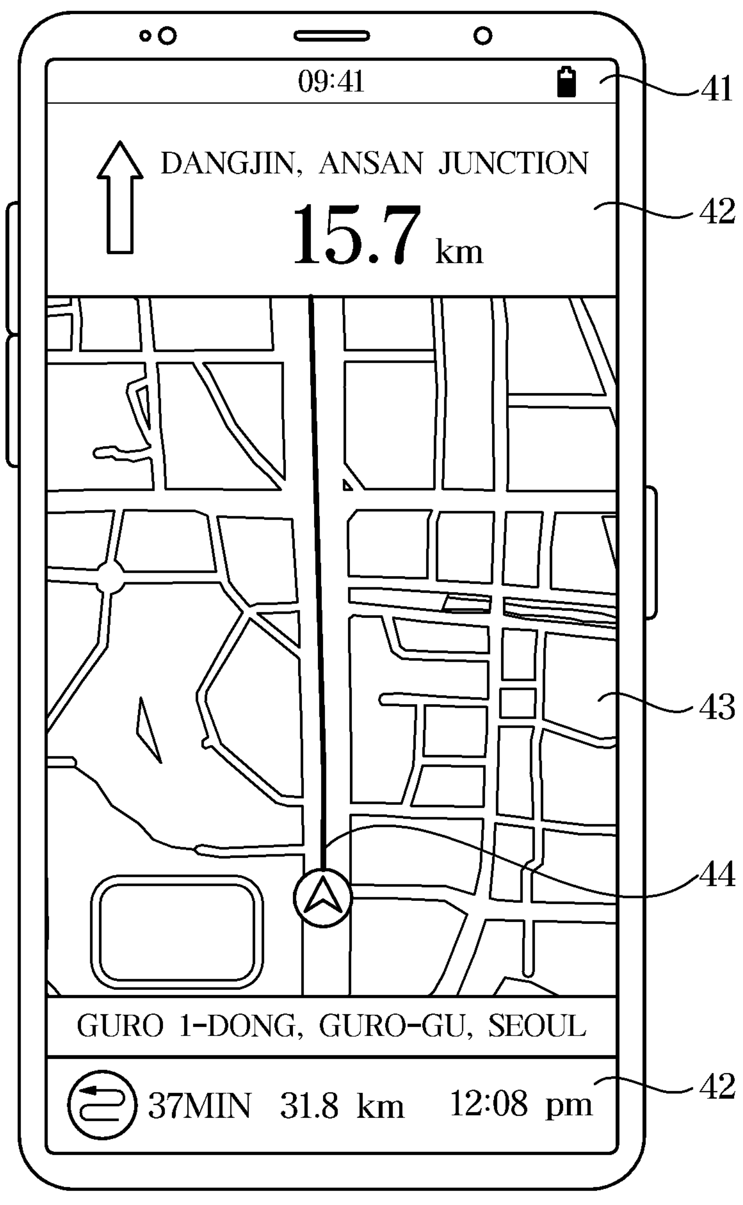
FIG. 4 is a diagram illustrating an example where a user equipment displays route information to a POI according to an embodiment.

FIG. 4 is a diagram illustrating an example where the user equipment 100 displays route information to a POI according to an embodiment.

As shown in FIG. 4, according to an embodiment, the display module 130 of the user equipment 100 may include a state display area 41, POI guide areas 42, and a route information output area 43.

For example, the controller 150 may control the display module 130 to display a feature (turn by turn (TBT) mode) of a route of the user equipment 100, a remaining distance, an estimated time taken to a POI, and the like, in the POI guide areas 42.

Here, for example, 2D route information 44 may be generated by the controller 150 based on delivery information and 2D map information stored in the database 140, without being limited thereto.

Figure 5:
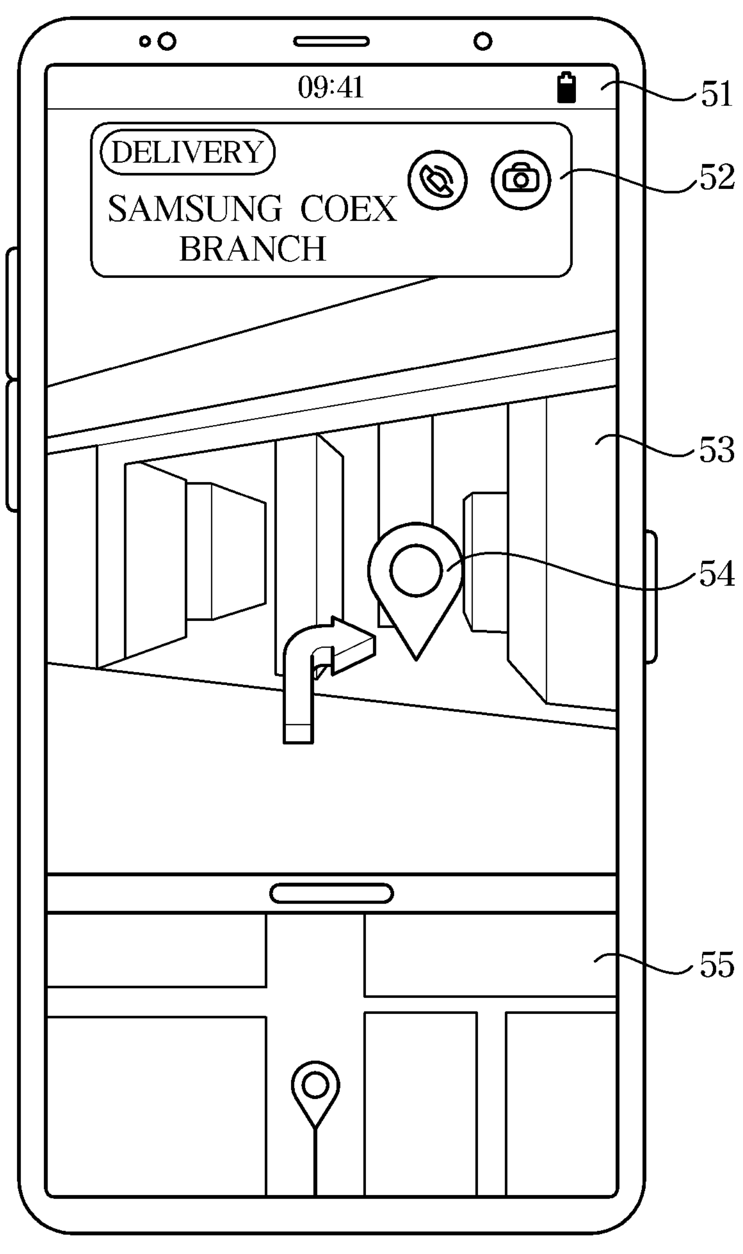
FIG. 5 is a diagram illustrating an example where the user equipment photographs a POI according to an embodiment.

FIG. 5 is a diagram illustrating an example where the user equipment 100 photographs a POI according to an embodiment.

As shown in FIG. 5, according to an embodiment, the display module 130 of the user equipment 100 may include a state display area 51, a delivery information area 52, a first route information output area 53 and a second route information output area 55.

For example, the state display area 51 may include information about a time, a radio signal strength (intensity), and a battery level, without being limited thereto.

Also, for example, the delivery information area 52 may include information about a type of delivery (e.g., pickup, shipping, etc.), and when the type of delivery is pickup, information on whether a package is ready, location information, and the like may be provided in the delivery information area 52. Also, the delivery information area 52 may provide an interface to connect a phone call to a delivery destination and connect photographing for the VPS map update.

For example, the controller 150 may control the display module 130 to display 2D route information or 3D route information in the first route information output area 5. The first route information output area 53 may include a remaining distance to the POI.

Also, for example, when the controller 150 controls the display module 130 to output the 3D route information, 3D route information as an AR-based 3D virtual object may be displayed in the first route information output area 53. In this case, the controller 150 may control the display module 130 to display the 2D route information in the second route information output area 55.

For example, the 3D route information may be generated by the controller 150 based on VPS map information and a surrounding image photographed by the image sensor 110, without being limited thereto.

Meanwhile, for instance, the controller 150 may control the display module 130 to display a 3D virtual object 54 representing a location of the POI on the surrounding image photographed by the image sensor 110, in the first route information output area 53, based on the VPS map information, delivery information, and the surrounding image photographed by the image sensor 110.

For example, the 3D virtual object 54 may be information included in the delivery information. That is, an administrator (or a delivery client) at a delivery destination may input a POI location based on video or image information about the delivery destination and transmit the POI location to the server 200, and thus the controller 150 may control the display module 130 to display the 3D virtual object 54 in the first route information output area 53.

Figure 6:
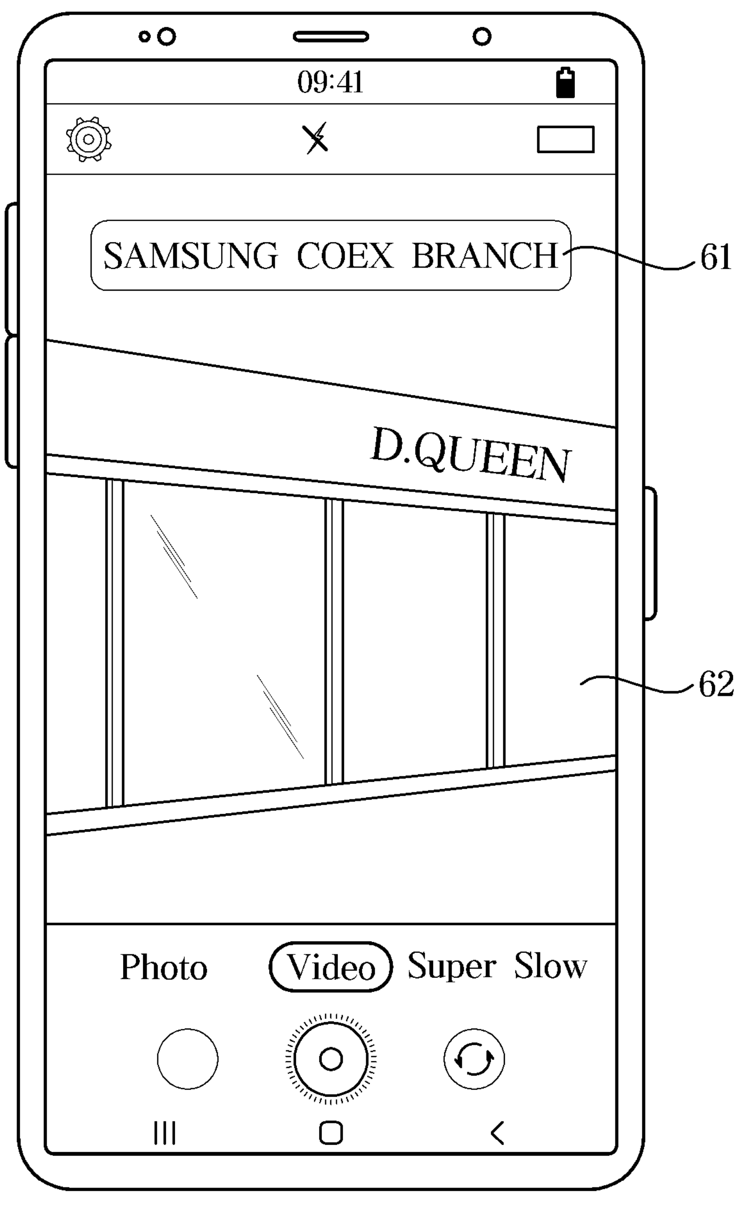
FIG. 6 is a diagram illustrating an example where a user equipment shoots a video to update a visual positioning system (VPS) map according to an embodiment.

FIG. 6 is a diagram illustrating an example where the user equipment 100 shoots a video to update a VPS map according to an embodiment.

As shown in FIG. 6, according to an embodiment, the display module 130 of the user equipment 100 may include a location display area 61 and an image display area 62.

For instance, the location display area 61 may indicate user location information detected by the sensor 160. According to another embodiment, the location display area 61 may indicate user location information generated by the controller 150 based on VPS map information and a surrounding image photographed by the image sensor 110, without being limited thereto.

That is, the controller 150 may control the display module 130 to display video or image information related to a place displayed on the location display area 61 in the image display area 62. In this instance, for example, an image or video displayed in the image display area 62 may be the surrounding image photographed by the image sensor 110.

As shown in FIG. 6, a user may update a VPS map based on a user's location and video or image data related to the user's location. Accordingly, metadata for training a VPS positioning model may be generated as described above. Accordingly the user may be provided with a reward point for the update.

Hereinafter, operations of a control method of a user equipment according to an embodiment are described based on the description above.

Figure 7:
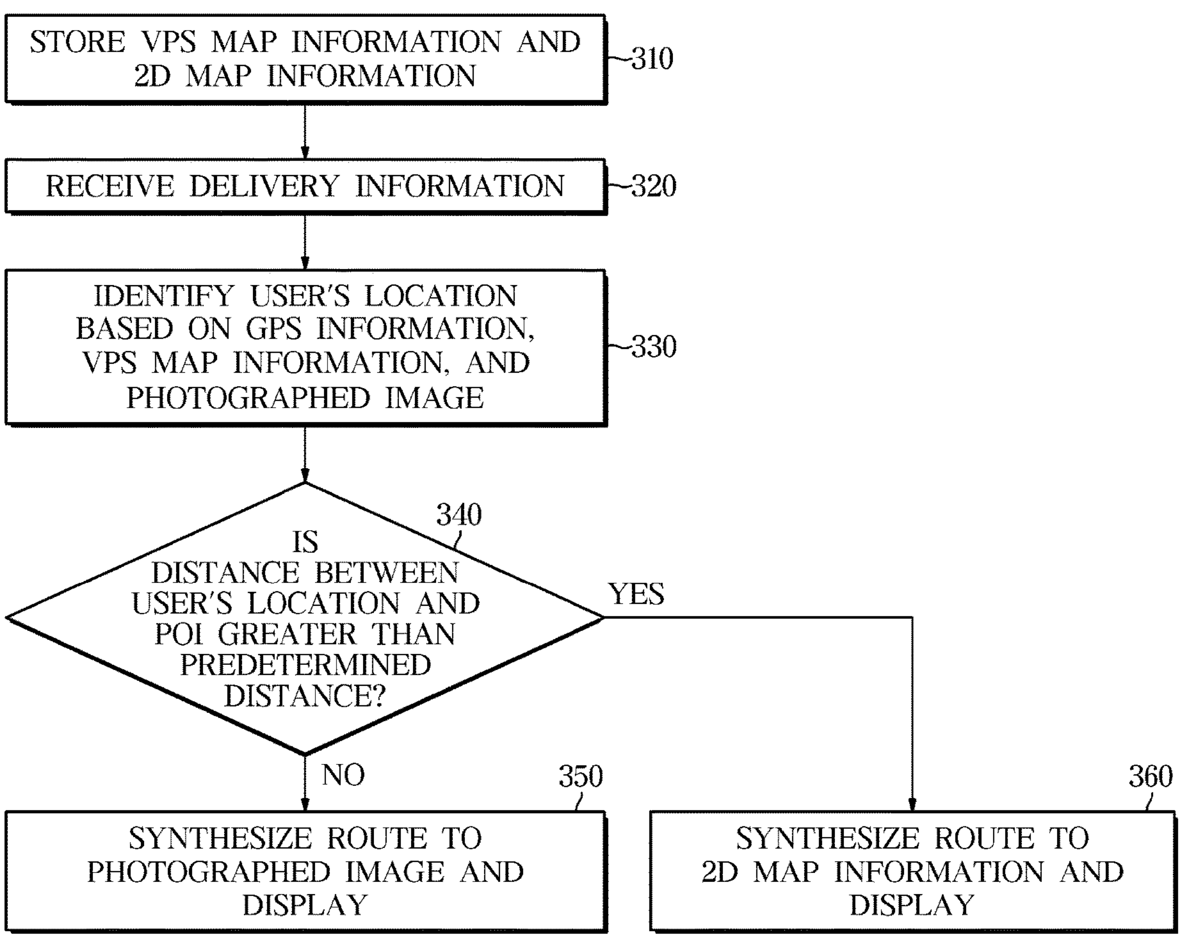
FIG. 7 is a flowchart illustrating an embodiment of providing route information to a POI in a control method of a user equipment according to an embodiment.
Figure 8:
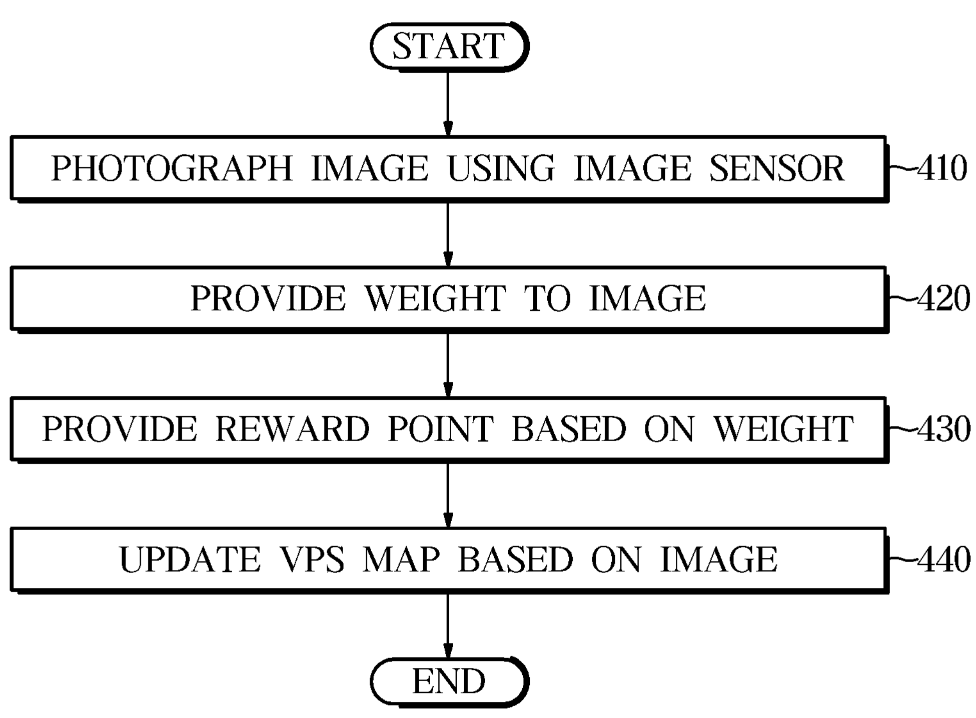
FIG. 8 is a flowchart illustrating an embodiment of updating a VPS map based on a photographed surrounding image through user participation in a control method of a user equipment according to an embodiment.

FIG. 7 is a flowchart illustrating an embodiment of providing route information to a POI in a control method of a user equipment according to an embodiment. FIG. 8 is a flowchart illustrating an embodiment of updating a VPS map based on a photographed surrounding image through user participation in a control method of the user equipment 100 according to an embodiment.

The control methods shown in FIGS. 7 and 8 may be implemented by the user equipment 100 described above. Accordingly, even when not specifically described below, the description of the user equipment 100 may be equally applied to the control methods.

Referring to FIG. 7, the user equipment 100 may store VPS map information and 2D map information (310).

The user equipment 100 may receive delivery information from the server (320).

The user equipment 100 may identify a user's location based on GPS information, the VPS map information, and a surrounding image photographed by the image sensor 110 (330).

The user equipment 100 may identify a distance between the user's location and a POI (340).

When the distance between the user's location and the POI is not greater than a predetermined distance (i.e., is less than or equal to the predetermined distance) (NO to 340), the user equipment 100 may synthesize 3D route information represented as an AR-based 3D object on the surrounding image photographed by the image sensor 110 (350).

When the distance between the user's location and the POI is greater than the predetermined distance (YES to 340), the user equipment 100 may synthesize a route on the 2D map information (360).

Referring to FIG. 8, the user equipment 100 may photograph an image using the image sensor 110 (410).

The user equipment 100 may provide a weight to the image (420).

The user equipment 100 may provide a reward point based on the weight (430).

The user equipment 100 may update a VPS map based on the image (440).

As is apparent from the above, according to the embodiments of the disclosure, the user equipment and the control method thereof can increase a usability of POI search regardless of being indoors or outdoors (environmental conditions) and an absence of GPS, and reduce total cost of ownership (TCO) through user participation.

Embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include read only memory (ROM), random access memory (RAM), magnetic tapes, magnetic disks, flash memories, and optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A user device, comprising:

an image sensor configured to photograph a surrounding image;

a display module;

a communication circuitry configured to communicate with a server;

a database configured to store visual positioning system (VPS) map information based on augmented reality (AR) and two dimensional (2D) map information; and a controller configured to:

identify a location of the user device based on the surrounding image and the VPS map information by using a VPS positioning model, the VPS positioning model being trained using metadata including the surrounding image and photographing direction information and excluding image data photographed in a direction of a ground;

generate 2D route information based on the 2D map information and delivery information received from the server;

generate three dimensional (3D) route information based on the delivery information and the VPS map information; and control the display module to display the 2D route information and the 3D route information based on an actual distance between the location of the user device and a location of a point of interest (POI) included in the delivery information, the 3D route information being based on augmented reality;

wherein the controller is configured to:

based on the actual distance between the location of the user device and the location of the POI being greater than a predetermined distance, control the display module to display the 2D route information, and based on the actual distance between the location of the user device and the location of the POI being less than or equal to the predetermined distance, control the display module to display the 3D route information; and wherein the predetermined distance is adaptively determined based on at least one of a building boundary detected at the location of the user device, a road width detected at the location of the user device, a congestion level detected at the location of the user device, or a user speed.

2. The user device of claim 1, wherein the controller is configured to generate a synthesized image by synthesizing the POI represented as an AR-based 3D object to the surrounding image and to control the display module to display the synthesized image.

3. The user device of claim 1, wherein the database is configured to update the VPS map information based on the surrounding image.

4. The user device of claim 3, wherein the controller is configured to provide a weight to the surrounding image based on a feature of the surrounding image and to provide a reward point when the weight is higher than a predetermined reference.

5. The user device of claim 4, wherein the weight is provided based on a resolution, a capacity, or a length of the surrounding image, and the reward point varies depending on a sum of the weights.

6. The user device of claim 1, wherein the controller is configured to generate route information so that a time, a movement distance, or a congestion level is minimized.

7. The user device of claim 6, wherein the controller is configured to generate real- time route information based on the location of the user device and the delivery information.

8. A control method of a user device, the control method comprising:

storing visual positioning system (VPS) map information and two dimensional (2D) map information, the VPS map information being based on augmented reality (AR);

receiving delivery information from a server;

photographing a surrounding image by an image sensor;

identifying a location of the user device based on the surrounding image and the VPS map information by using a VPS positioning model, the VPS positioning model being trained using metadata including the surrounding image and photographing direction information and excluding image data photographed in a direction of a ground;

generating 2D route information based on the delivery information and the 2D map information;

generating three dimensional (3D) route information based on the delivery information and the VPS map information; and controlling a display module to display the 2D route information and the 3D route information based on an actual distance between the location of the user device and a location of a point of interest (POI) included in the delivery information;

wherein controlling the display module comprises:

based on the actual distance between the location of the user device and the location of the POI being greater than a predetermined distance, controlling the display module to display the 2D route information; and based on the actual distance between the location of the user device and the location of the POI being less than or equal to the predetermined distance, controlling the display module to display the 3D route information; and wherein the predetermined distance is adaptively determined based on at least one a building boundary detected at the location of the user device, a road width detected at the location of the user device, a congestion level detected at the location of the user device, a user speed.

9. The control method of claim 8, wherein controlling the display module comprises:

generating a synthesized image by synthesizing the POI represented as an AR-based 3D object to the surrounding image; and controlling the display module to display the synthesized image.

10. The control method of claim 8, wherein storing the VPS map information and the 2D map information comprises updating the VPS map information based on the surrounding image.

11. The control method of claim 10, further comprising:

providing a weight to the surrounding image based on a feature of the surrounding image; and providing a reward point when the weight is higher than a predetermined reference.

12. The control method of claim 11, wherein the weight is provided based on a resolution, a capacity, or a length of the surrounding image, and the reward point varies depending on a sum of the weights.

13. The control method of claim 8, wherein generating the 2D route information and the 3D route information comprises generating route information so that a time, a movement distance, or a congestion level is minimized.

14. The control method of claim 13, wherein generating the route information comprises generating real-time route information based on the location of the user device and the delivery information.

15. A non-transitory computer-readable medium storing computer executable instructions when executed by a processor causing the processor to perform steps of the control method of the user device of claim 8.

16. A method comprising:

storing map information;

receiving destination information;

photographing a surrounding image by an image sensor;

identifying a current location of a user device based on the surrounding image and VPS map information that is based on augmented reality (AR) by using a VPS positioning model, the VPS positioning model being trained using metadata including the surrounding image and photographing direction information and excluding image data photographed in a direction of a ground;

generating two dimensional (2D) route information based on the stored map information and the destination information;

controlling a display module to display 2D route information;

while travelling toward the destination, adaptively determining a distance to reach the destination, the adaptively determined distance based on a road width detected at the current location, a congestion level detected at the current location, or a speed of the travelling;

generating three dimensional (3D) route information based on the destination information and visual positioning system (VPS) map information that is based on augmented reality (AR); and in response to an actual distance to the destination being less than the adaptively determined distance, controlling the display module to display the 3D route information.

17. The method of claim 16, wherein storing the map information comprises storing the VPS map information and two dimensional (2D) map information;

wherein the 2D route information is generated based on the stored 2D map information; and wherein the 3D route information is based on the stored VPS map information and the surrounding image obtained by the image sensor.

18. The method of claim 16, wherein the adaptively determined distance is based on a building boundary detected at the current location and the speed of the travelling.

* * * * *